United States Patent [19]
Kaiser

[11] Patent Number: 5,680,336
[45] Date of Patent: Oct. 21, 1997

[54] CONTINUOUS WAVE SYNTHESIS FROM A FINITE PERIODIC WAVEFORM

[75] Inventor: Stephen G. Kaiser, Hoffman Estates, Ill.

[73] Assignee: Northrop Grumman Corporation, Los Angeles, Calif.

[21] Appl. No.: 230,030

[22] Filed: Apr. 19, 1994

[51] Int. Cl.⁶ .............................. G06F 1/02; G06F 17/15
[52] U.S. Cl. .................................... 364/721; 364/728.03
[58] Field of Search ........................... 364/718, 721, 364/722, 719, 720, 728.03, 728.05, 728.06, 728.07

[56] References Cited

U.S. PATENT DOCUMENTS

| | | | |
|---|---|---|---|
| 3,961,273 | 6/1976 | Tursh | 328/155 |
| 3,971,021 | 7/1976 | Cann | 343/18 E |
| 4,349,918 | 9/1982 | Gordon | 455/20 |
| 4,380,816 | 4/1983 | Nicholls | 375/94 |
| 4,493,090 | 1/1985 | Gordon | 375/4 |
| 4,595,992 | 6/1986 | Drogin | 364/569 |
| 4,723,216 | 2/1988 | Premerlani | 364/484 |
| 4,799,189 | 1/1989 | Grover | 364/900 |
| 5,045,950 | 9/1991 | Iwamura et al. | 358/319 |

*Primary Examiner*—Chuong D. Ngo
*Attorney, Agent, or Firm*—Terry J. Anderson; Karl J. Hoch, Jr.

[57] ABSTRACT

This invention synthesizes a continuous wave signal from a finite periodic complex signal waveform by digitizing the finite waveform, matching the phase of the digitized waveform at its recorded beginning (head) to its recorded end (tail) and then playing out the waveform over and over in a head-to-tail fashion. The quality of the "phase match" between the waveform head and tail as well as the head-to-tail segment length determines the frequency accuracy of the synthesized continuous waveform. The basic formula $$SSD_K = \sum_{1}^{n} (X_i - X_{i+k})^2$$

is used.

17 Claims, 6 Drawing Sheets

CONTINUOUS WAVE SYNTHESIS FROM A FINITE PERIODIC WAVEFORM

1. FIELD OF THE INVENTION

This invention relates to electronic countermeasure systems and more particularly, to a system for synthesizing a continuous wave signal from a finite period waveform.

2. BACKGROUND OF THE INVENTION

Man has engaged in war on the land, sea, air and the electromagnetic spectrum. The electromagnetic spectrum has been used by the military for improving communications, guidance of aircraft and missiles and the navigation of ships and planes. Control of the electromagnetic spectrum is important due to the military's increasing dependency on its use for surveillance of potential enemy forces, communications between military units, detection of enemy military forces and the guidance and control of its own airplanes and missiles. With a mastery of the electromagnetic spectrum, one could achieve an indispensable advantage over an enemy or a considerable deterrent against a potential aggressor.

Electronic warfare is the employment of electronic devices and techniques for the purposes of determining the existence and disposition of the enemy's electronic aids to warfare and the destruction or degradation of the effectiveness of the enemy's electronic warfare aids. Electronic countermeasures are offensive or defensive tactics, or devices that uses electronic and reflective apparatus to reduce the military effectiveness of enemy equipment involving electromagnetic radiation (such as radar, communication, guidance, or other radio wave devices).

In electronic countermeasure systems, it is often desired to create an electromagnetic continuous wave, i.e., a radio or radar wave whose successive sinusoidal oscillations substantially are identical over time and at the same frequency as an existing pulsed signal. This characteristic improves the ability of the system to handle different signal forms. While a continuous wave is often defined as extending from the beginning of time to the end of time, in the present disclosure, the terms "continuous wave" or "CW" are defined as a wave at a constant amplitude and frequency which is extending for a desired finite period.

A continuous wave (CW) signal operating at the same frequency as an existing pulsed signal may be generated by precisely measuring the carrier frequency of the pulsed signal and subsequently tuning an oscillator to that measured frequency. One of the disadvantages of the above frequency "set on" technique is its relatively slowness to produce a representative CW signal.

Another procedure utilized by the prior art involves digitizing the pulsed signal, storing the pulsed signal in a digital memory, and then reading the pulsed signal out of the digital memory in a head-to-tail fashion. Unfortunately, head-to-tail reading or playback of the pulsed signal will usually produce a phase discontinuity at the head-to-tail junction. In other words there will be an abrupt change in the shape and slope of the pulsed signal at the junction of the head and the tail. The aforementioned phase discontinuity will produce an average frequency shift from the carrier of the pulsed waveform as well as create unwanted spectral lines. Thus, another disadvantage of the prior art is that the pulsed signal will have phase discontinuities and spurious spectral lines.

Reference may be had to the following patents for further information concerning the state of the prior art.

In U.S. Pat. No. 3,961,273, issued Jun. 1, 1976, entitled "Frequency Memory Apparatus" to Trush, there is disclosed a frequency memory apparatus in which an input signal is stored in a regenerative oscillatory loop. The phase delay of the loop is adjusted during the time of the first recirculation of the pulse, in increments of 90° in one embodiment and increments of 180° in another embodiment, to concentrate the output power at the frequency of the input signal.

U.S. Pat. No. 3,971,021, issued Jul. 20, 1976, entitled "Coherent Frequency Memory" to Cann, discloses hybrid phasing circuit for both phase detection and phase shifting in a quasi-coherent memory to produce an essentially constant amplitude CW signal which is later gated to produce constant amplitude false range pulses. In one mode of operation the subject circuit acts as a phase detector to sense the phase difference between a portion of the received signal and the recirculated signal. In the other mode of operation the subject circuit acts as a phase shifter to phase shift the recirculated signal such that this phase difference is less than 45°. This effectively adjusts the loop delay for the wavelength of the incoming signal.

In U.S. Pat. No. 4,595,992, issued Jun. 17, 1986, entitled "Encoding And Decoding Device For Narrow Bandwidth Coherent Signals" to Drogin, there is disclosed an apparatus that provides CW coherent replications which is synchronized in both phase and frequency to a sample of an RF pulse or CW input. In addition, the period data is stored, making it possible to produce the replicated frequency for as long as desired. The data in storage is at an information theoretic minimum and RF pulse or CW input can be sampled to achieve a CW output with minimal "head-to-tail" repeat phase transients. The aforementioned patent does not disclose a method to select the optimum head-to-tail readout period. The apparatus of the above patent effectively encodes the amplitude of signals to a single bit.

U.S. Pat. No. 4,723,216, issued Feb. 2, 1988, entitled "Digital Frequency-Locked Loop For Use With Staggered Sampling Systems" to Premerlani discloses an apparatus in which a digital frequency locked loop is implemented with programmable signal processing method for use in systems employing staggered sampling. By minimizing the sum of the square of the errors between the predicted values and the measured values, with respect to amplitude, phase angle and frequency, a sampling signal can be provided having a frequency which is in constant proportions to the frequency of the analog input signal.

U.S. Pat. No. 4,799,189, issued Jan. 17, 1989, entitled "Resynthesized Digital Radio Frequency Memory" to Grover discloses a resynthesized DRFM. A conventional DRFM is utilized with the addition of a computer device. Once the digital pattern signals are stored they are utilized to generate a digital pattern which fills the interpulse period between the pair of signals. The interpulse digital pattern is then adjusted so that the digital pattern phases of the first and second signals match.

SUMMARY OF THE INVENTION

The present invention describes a system of synthesizing a substantially CW signal from a finite periodic complex signal waveform. The system digitizes samples of the periodic waveform; subtracts, on a sample-by-sample basis, the first n digitized samples (a reference segment) of the periodic waveform from each of the corresponding digitized samples of a later base segment of the periodic waveform. The results are squared to form the stored sum of squares $[SSD_k=(X_i-X_{i+k})^2]$; and derive therefrom a minimum value, wherein i and (i+k) are indices indicating locations of samples in the waveform for, respectively, the reference and the base segments, and k is not equal to zero. The squared results are summed until the corresponding recorded waveform tail address is optimally phase matched with the waveforms beginning head address.

DETAILED DESCRIPTION OF THE INVENTION

Overview

This invention overcomes the disadvantages of the prior art by providing an apparatus and method for rapidly creating a continuous wave (CW) signal at the same frequency as an existing pulsed signal, while minimizing or eliminating any phase discontinuities at the junctions of the heads and tails of the CW. The aforementioned is achieved by utilizing an algorithmic, head-to-tail period adjustment technique. The technique determines in real time the optimum head-to-tail period adjustment. An optimized head-to-tail signal is produced almost immediately after the pulsed waveform is received. Thus, a real time jamming response is therefore possible.

This invention synthesizes a CW signal from a finite periodic complex signal waveform by digitizing the finite waveform, matching the phase of the digitized waveform at its recorded beginning (head) to its recorded end (tail) and then playing out the waveform over and over in a head-to-tail fashion. The quality of the "phase match" between the waveform head and tail as well as the head-to-tail segment length determines the frequency accuracy of the synthesized CW waveform. The phase matching procedure is described below.

The first n digitized samples of the recorded waveform (called the reference segment) are subtracted on a sample-by-sample basis from the n samples of a later base segment, and the result is squared, then the products are summed and stored. Next the reference segment is moved over one sample (k is decremented) and the above subtraction, squaring, summing and storing operation is repeated. This procedure is illustrated in equation (1).

$$SSD_k = \sum_{i=1}^{n} (x_i - x_{i+k})^2 \qquad (1)$$

Where:

$SSD_k = k_{th}$ summed, squared difference $x_i$=sampled signal value at address i This operation is continued until the stored sum of squares ($SSD_k$) reaches a minimum value (k not equal to zero). At this point, the corresponding recorded waveform tail address is optimally phase matched with the waveform's beginning head address. The resulting frequency error of the CW synthesized waveform would then be equal to:

$$F_e = \frac{\theta}{2\pi\tau} \qquad (2)$$

Where:

$F_e$=Frequency error (Hz)

$\theta$=Phase mismatch (radians)

$\tau$=Time Length of head-to-tail segment (sec)

To minimize the frequency error, equation (2) is used to select the head-to-tail segment by substituting $\theta$ with the summed-squared-differences values ($SSD_k$) and search for minimum $F_e$.

The above procedure works well for n=16. A simplification of the algorithm was implemented in a Digital Radio Frequency Memory (DRFM). Instead of squaring and summing a 16 sample reference waveform difference, the absolute value of a 2 sample reference waveform difference is summed. This is illustrated in equation (3).

$$SSD_k = \sum_{i=1}^{n} |x_i - x_{i+k}| \qquad (3)$$

This simplication minimizes the required number of adders and requires no multipliers. In addition, the division in equation (2) is approximated by a logical "digit shift" whenever the time segment is changed by a factor of two. The shifting operation eliminates the need for arithmetic division. Also, the reference segment is compared to the data segment in the forward direction (k starts small and is incremented) so that computations may proceed while the data is written into memory in real time.

Specific Embodiments

Figure 1:
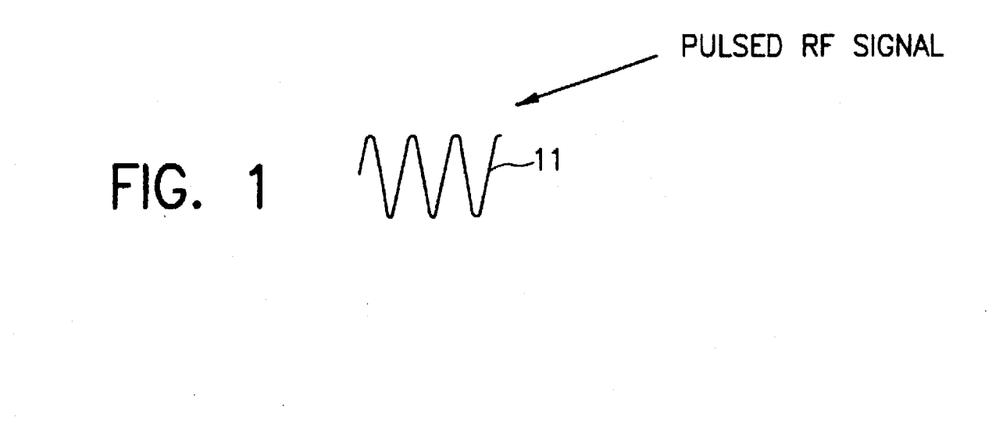
FIG. 1 is a drawing of a pulsed RF signal.

Referring now to the drawings in detail, and more particularly to FIG. 1, the reference character 11 represents a pulsed RF signal.

Figure 2:
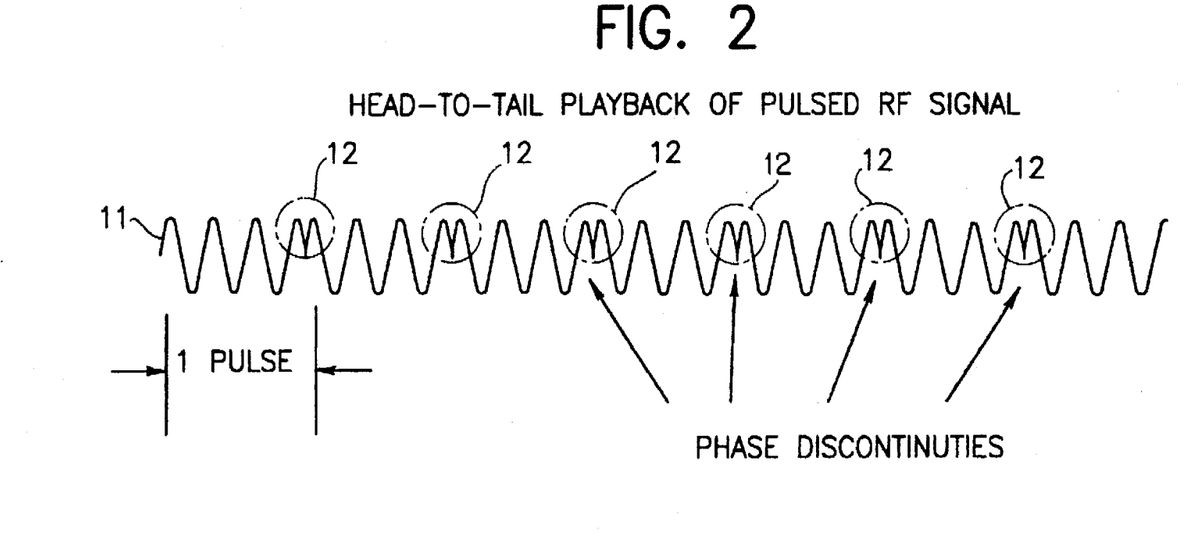
FIG. 2 is a drawing of a pulsed RF signal that has been played back by an apparatus utilized in the prior art.

FIG. 2 is a drawing showing the pulsed RF signal 11 of FIG. 1 after it has been digitized, stored in a digital memory and then read out of memory over and over in a head-to-tail fashion by a prior art apparatus. Head-to-tail playback of pulsed RF signal 11 will, in general, produce phase discontinuity 12 at the head-to-tail junction of each pulse of pulsed RF signal 11. Phase discontinuity 12 will produce an average frequency shift from the carrier of pulsed RF signal 11 as well as create unwanted spectral lines, as are described in the description of FIG. 3.

Figure 3:
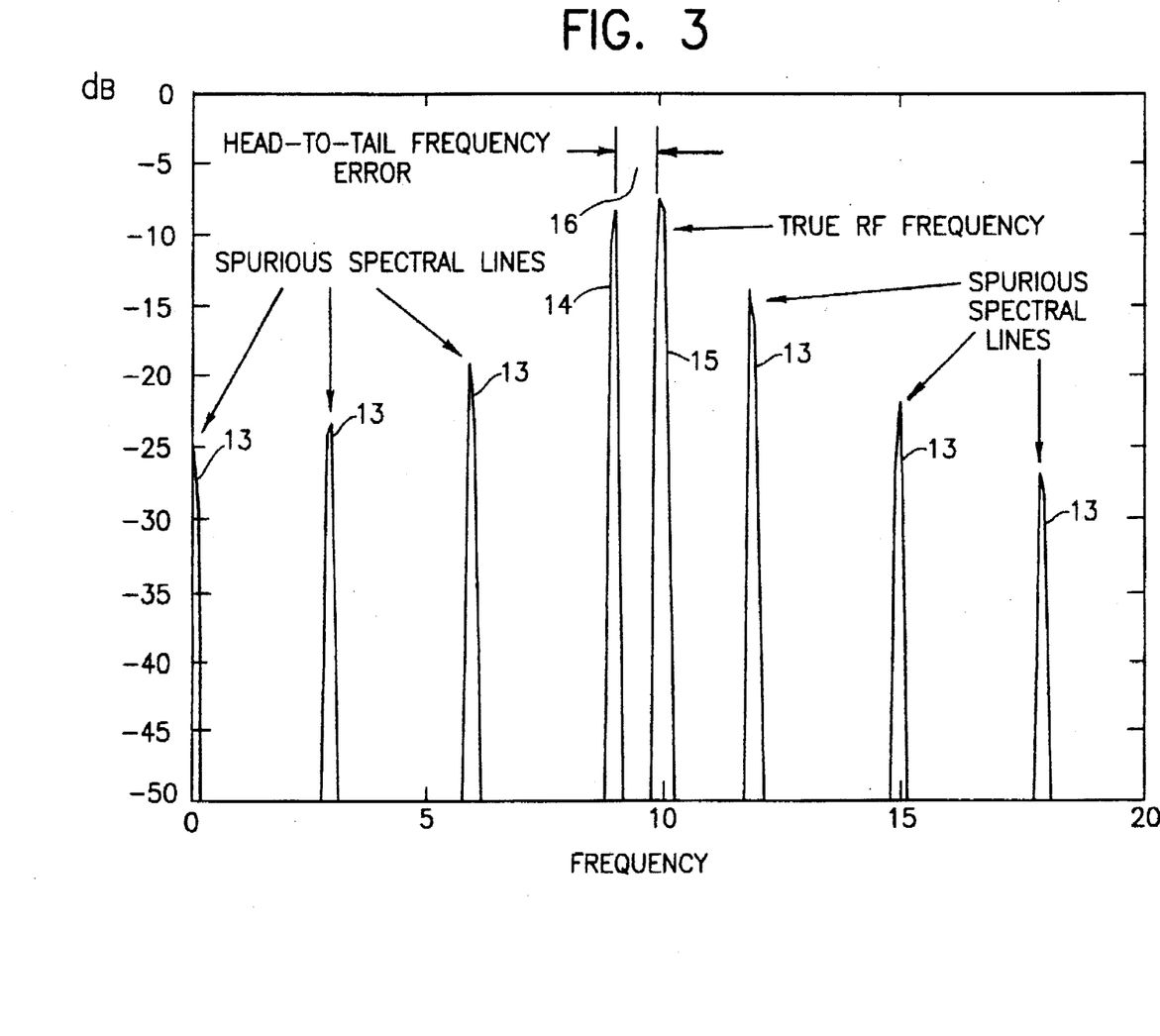
FIG. 3 is a drawing showing unwanted spectral lines in the pulsed signal of FIG. 2.

FIG. 3 is a drawing illustrating frequency vs. dB (decibels) for a regenerated pulsed signal 11 of FIG. 2 showing unwanted or spurious spectral lines 13, and CW frequency line 14. The true RF frequency line 15 is not present in the head-to-tail regenerated spectrum (it is shown on this graph for illustration only). The frequency error between the regenerated CW line 14 and true RF frequency line 15 is shown by 16.

Figure 4:
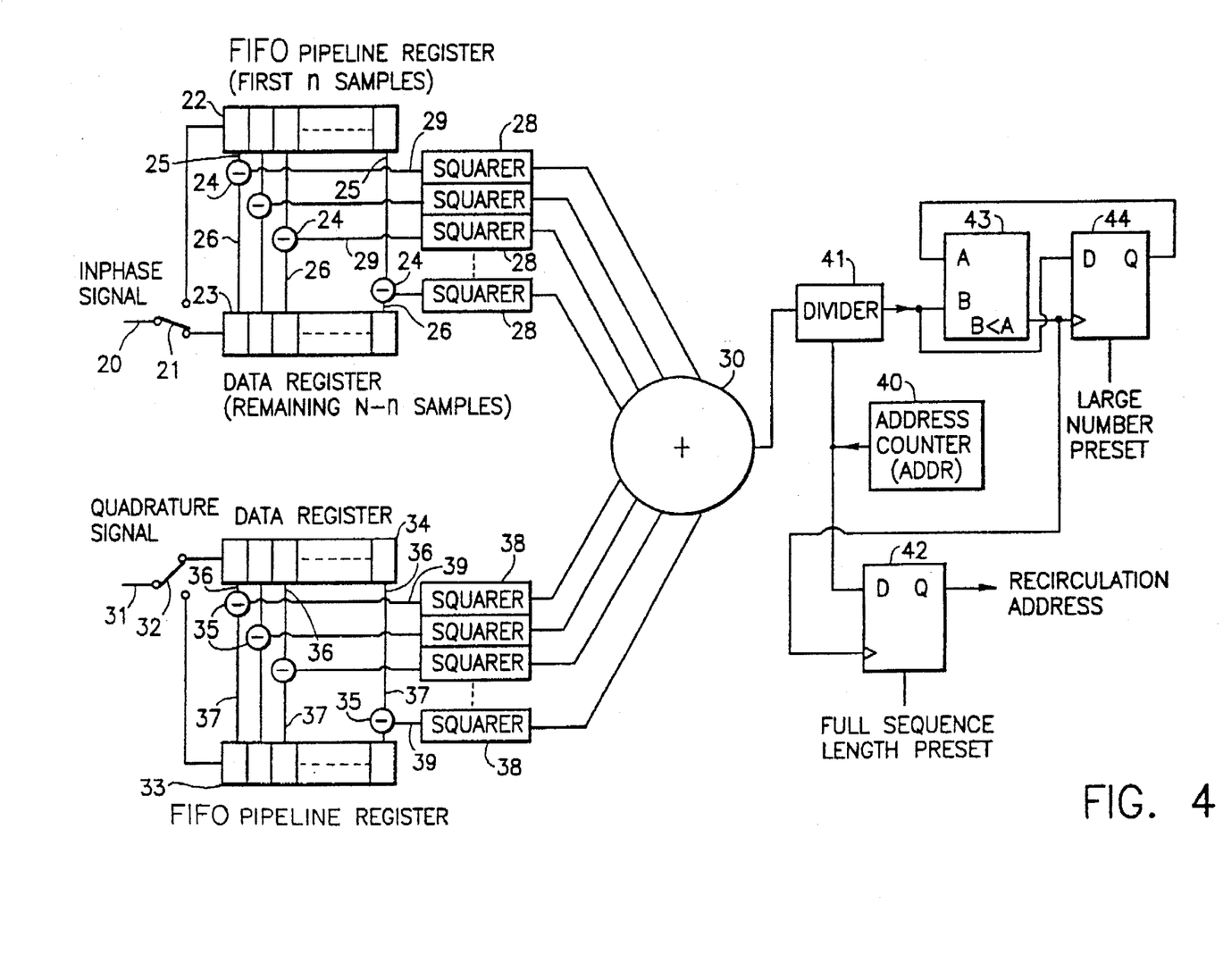
FIG. 4 is a block drawing of the apparatus of this invention being used to process a complex waveform signal.

FIG. 4 is a block drawing of one embodiment of apparatus of the present invention being used to process a complex digital signal of the form:

$$s(t) = x(t) + jy(t)$$

where $x(t)$=the real part of the signal (inphase) and y(t)=the imaginary part of the signal (quadrature).

The quadrature portion of the signal can be obtained through a Hilbert transform operation or by complex frequency conversion. A Hilbert transform operation of a function f(s) is realized by taking the integral of $1/\pi(f(s)/[t-s])$. The Hilbert transform can be approximated closely with a digital finite impulse response (FIR) filter.

The inphase portion of the complex signal is transmitted on line 20. Switch 21 connects the inphase portion of the complex signal to a first-in-first-out (hereafter referred to as "FIFO") pipeline register 22. The register 22 is an n position sample register in which each of the n samples are multi-bit words that may be shifted one or more positions to the right. A data register 23 is an n-position sample register in which each of the n samples are multi bit words that may be shifted one or more positions to the right. One of a plurality of subtractors 24 is individually coupled between a position on the FIFO pipeline register 22 and a corresponding position on the data register 23 by wires 25 and 26, respectively. The output of each subtractor 24 is individually coupled to the input of one of a plurality of squarers 28, via wire 29. There are n squarers 28. The outputs of squarers 28 are coupled to the inputs of summer 30.

The imaginary or quadrature portion of the complex signal is transmitted on line 31. Switch 32 connects the quadrature portion of the complex signal to FIFO pipeline register 33, which is an n position sample register in which each of the n samples are multi bit words that may be shifted one or more positions to the right. Data register 34 is an n-position sample register in which each of the n samples are multi bit words that may be shifted one or more positions to the right. One of the two ports of each of a plurality of subtractors 35 (there are n subtractors) are coupled between the FIFO pipeline register 33 and corresponding position on a data register 34 by wires 37 and 36, respectively. The output of each subtractor 35 is individually coupled to the input of one of a plurality of squarers 38 via one of a plurality of wires 39. There are n squarers. The output of each squarer 38 is individually coupled to adder 30.

The adder 30 is coupled to an arithmetic divider 41. An address counter 40 is coupled both to one of the two inputs of the divider 41 and the D input of a flip flop 42. The second input to divider 41 is the output of counter 40. The output of divider 41 is coupled to the B input of a comparator 43 and the D input of flip flop 44. The Q output of flip flop 44 is connected to the A input of the comparator 43. When the value at port B is less than the value at port A, comparator 43 generates an output which is communicated to the clock inputs of the flip flops 44 and 42.

The inphase portion of the digital complex waveform signal will be transmitted over wire 20, and the quadrature portion of the digital complex waveform signal will be transmitted over wire 31. Switches 21 and 32 will be, respectively, set to FIFO pipeline register 22 and FIFO pipeline register 33. The first n sample (multi bit words) of the inphase portion of the digitized complex signal are clocked into FIFO pipeline register 22 and the first n samples (multi bit words) of the quadrature portion of the digitized complex signal are clocked into FIFO pipeline register 33. After n samples are respectfully stored in FIFO pipeline registers 22 and 33, switches 21 and 32 are respectfully moved so that the inphase portion of the complex signal will be transmitted to data register 23 and the quadrature portion of the complex signal will be transmitted to data register 34. The remaining samples of the inphase portion of the complex signal will be continuously clocked through data register 23 and the remaining samples of the quadrature portion of the complex signal will be continuously clocked through data register 34.

During each clock cycle, subtractors 24 and 35 will, respectively, subtract the samples contained in data register 23 and 32 from the samples stored in FIFO pipeline registers 22 and 33, respectively (on a sample by sample basis). For example, on clock cycle 2n+1, signal sample 1 in FIFO pipeline registers 22 and 33 is respectfully subtracted from signal sample n+1 in data register 23 and 32; and signal sample 2 in FIFO pipeline registers 22 and 33 is respectfully subtracted from signal sample n+2 in data registers 23 and 34, etc.

Likewise, on the next clock cycle (2n+2), signal sample 1 in FIFO pipeline registers 22 and 33 is respectively subtracted from signal sample n+2 in data registers 23 and 34 and signal sample 2 in FIFO pipeline registers 22 and 33 is respectively subtracted from signal sample n+3 in data registers 23 and 34 etc. The aforementioned sliding difference operation is continued for the entire length of the finite complex signal.

During each clock cycle, each of the n computed differences determined by subtractors 24 and 35 are respectively squared by squarers 28 and 38, respectively, and then summed by summer 30. At this juncture the summed-squared-differences are then divided by the respective address count at the divider 41 (counter 40 is initialized to zero when the complex signal is received) to inversely scale the summed-square-differences by the number of samples processed. The resultant numeric value (scaled-summed-squared-differences) is inversely related to the optimum head-to-tail match point for re-circulation playback. In other words, when this numeric value is small, the corresponding head-to-tail match point would produce a small frequency error on re-circulated playback.

Comparator 43 and Flip Flop 44 combine to find the smallest scaled-summed-squared-difference value in the entire finite waveform. Initially, a large numeric value is latched into port A of comparator 43 as the scaled-summed-squared-difference value is clocked into port B. When the numeric value stored in port B of comparator 43 is less than the numeric value stored in port A, the numeric value stored in port B is latched directly into flip flop 44. The corresponding address is latched into flip flop 42. Progressively smaller scaled-summed-squared-difference values, and their addresses, are latched into flip flops 44 and 42, respectively. After the entire finite complex signal is processed, flip flop 44 contains the smallest scaled-summed-squared-difference and flip flop 42 contains its address. The address value is used to set the re-circulation head-to-tail playback segment length.

The size of registers 22, 23, 33 and 34 are n, where n needs only be equal to one if the complex signal is in perfect quadrature and contains no noise. However, if the complex signal has phase and/or amplitude imbalance between the real (inphase) and imaginary (quadrature) components, then n must be greater than one.

Figure 5:
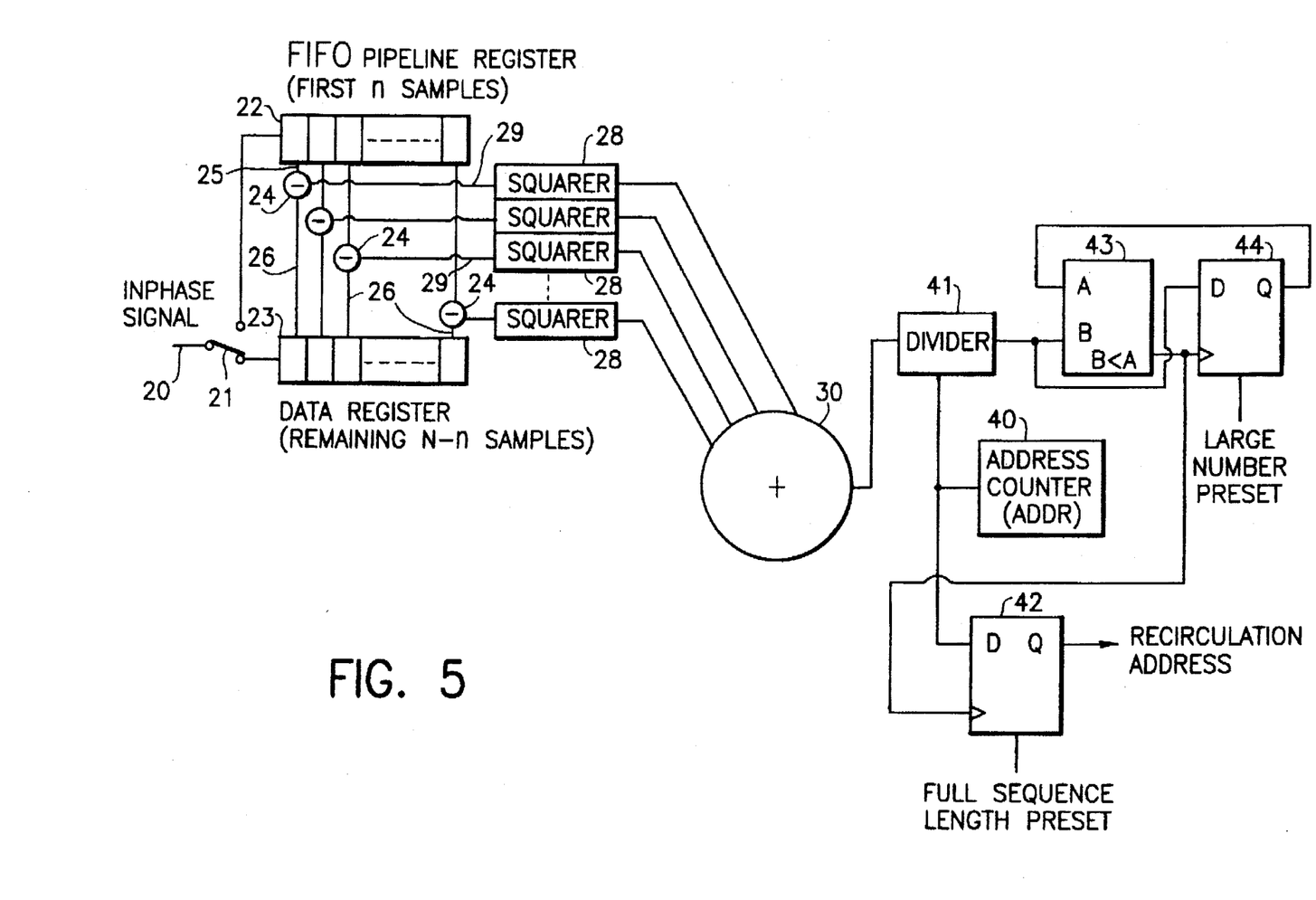
FIG. 5 is an alternate embodiment of the apparatus shown in FIG. 4, that only operates on the inphase portion of the complex waveform signal.

FIG. 5 is an alternate embodiment of the apparatus shown in FIG. 4. The apparatus shown in FIG. 5 is a simplification of the apparatus shown in FIG. 4 in that it only operates on the real or inphase portion of the complex signal. Thus, the apparatus shown in FIG. 5 is exactly like the apparatus shown in FIG. 4 except that the portion of the apparatus that was used for the quadrature portion of the complex signal is deleted. Hence, wire 31, switch 32, registers 33 and 34, subtractor 35, wires 36, 37 and 39 and squarers 38 are deleted from the apparatus shown in FIG. 4.

When the imaginary or quadrature portion of the complex waveform signal is not used, as is the case in the FIG. 5 embodiment, the second harmonic generated from the squaring operation performed by squarers 38 (FIG. 4) is not cancelled. Therefore, the second, and greater harmonics have to be removed by filtering. An implicit digital FIR filter is formed by summing the n values of the squared-differences. In order to have effective filtering, n must be larger than one. If the input signal frequency is constrained to be within the middle 33% of the Nyquist bandwidth, then n should be at least equal to six. When n is equal to six and the input frequency lies within the middle 33% of the Nyquist bandwidth, the second harmonic will fall within the higher lobes of the sin (f)/f frequency response formed by the summer (implicit boxcar averager). If noise is present on the signal, a larger n would be beneficial. One embodiment of a computer program which may be utilized for simulating the digital filter apparatus of FIG. 5 is as follows (the following program is programmed in BASIC):

```
100  DECLARE SINGLE X(32768), A(128)
110  declare DOUBLE SUM
120  input "DATE FILE? ";F$
130  input "NUMBER OF POINTS IN DATA FILE? ";N
140  input "BEGINNING INDEX INCLUSIVE? ";IB
150  iput "COMPARISON SEGMENT
     ENDING INDEX INCLUSIVE? ";IC
160  let NSEG = IC-IB + 1
170  print
180  print ". . . number of terms in segment = ";NSEG
190  print ". . . obtaining data from ";F$
200  open F$ FOR INPUT AS #1,SEQUENTIAL,
     ACCESS READ,RECORDTYPE NONE
210  for I = 1 TO N
220  GET #1
230  MOVER FROM #1, INDX,X(INDX)
240  next I
250  close #1
260  print "THE SIZE OF THE PHASE ADAPTED
     SEGMENT IS THE SEGMENT DIFFERENCE +1"
270  let SMALLEST = 1.E + 30
280  for I = N-NSEG to 1 step-1
290  let SUM = 0
300  let PEAKERROR = 0
310  for J = 1 to NSEG
320  let DELTA = A(J)-X(I + J-1)
330  let SUM = SUM + DELTA*DELTA
340  if abs(DELTA)>abs(PEAKERROR) then let
     PEAKERROR = DELTA
350  next J
360  if SUM<SMALLEST then !FIND SMALLEST (BEST MATCH)
     let SMALLEST = SUM
370  G = sqr(SMALLEST/NSEG) !RMS AVG PER POINT
380  LOCATION = I !WHERE MATCH OCCURRED
390  ISIZE = LOCATION-IB
400  print "RMS ERROR = ";AVG;tab(24);
     "INCLUSIVE SEGMENT = ";IB;"-";LOCATION-1;
410  end if !PHASE ADPT SEGMENT IS
420  next I !ONE LESS THAN MATCH LOC
430  end
```

This program is stored on a VAX computer.

Figure 6:
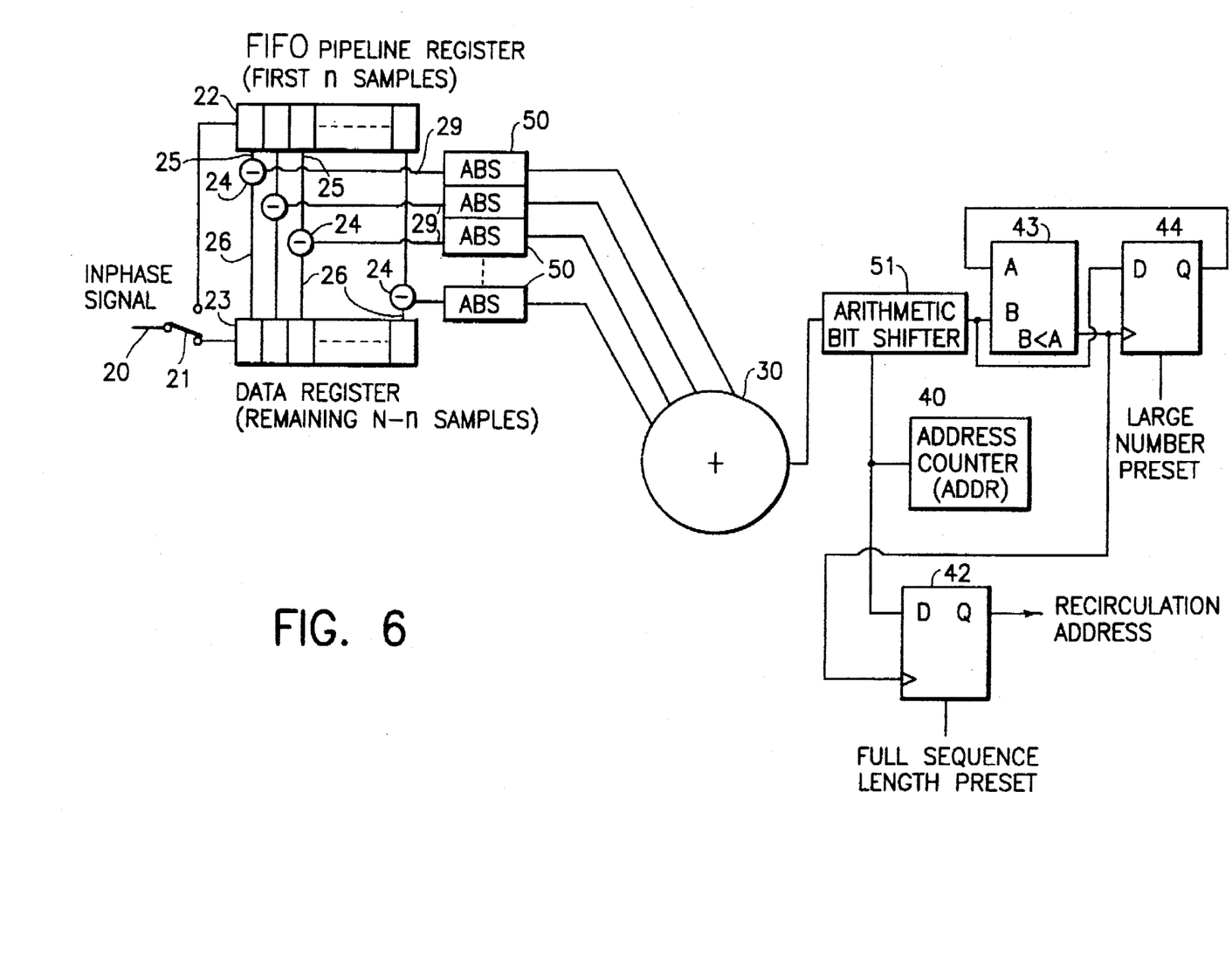
FIGS. 6 and 7 are alternate embodiment of the apparatus of the invention shown in FIG. 5, that only operates on the inphase portion of the complex waveform signal.

FIG. 6 illustrates an alternate embodiment of the present invention from the apparatus shown in FIG. 5, in which the divider 41 is replaced by an arithmetic bit shifter 51. The arithmetic bit shifter 51 emulates division-by-two by shifting the multi-bit sum word one bit to the right. To emulate division-by-four, it shifts the multi-bit sum word two bits to the right. In operation, it performs k right bit shifts on each sum word where k=log$_2$(address word) to emulate division by two, four, eight, etc. therefore approximating continuous division.

The inphase portion of the complex signal is transmitted on line 20. Switch 21 connects the inphase portion of the complex signal to FIFO pipeline register 22. FIFO pipeline register 22 is an n sample register in which each of the n samples are multi-bit words configured as a FIFO pipeline. Data Register 23 is an n sample register in which each of the n samples are multi-bit words configured as a FIFO pipeline. One of the two ports of a plurality of subtractors 24, that contain n subtractors are individually coupled to a corresponding position of FIFO pipeline register 22 by wires 25. The second ports of subtractors 24 are individually coupled to a corresponding position of data registers 23 by wires 26. The output of each subtractor 24 is individually coupled to the input of a plurality of absolute value determiner 50 via a plurality of wires 29. Absolute value determiner 50 contain n positions. Absolute value determiner 50 determines the absolute value of its input signal. The output of absolute value determiner 50 are coupled to the inputs of adder 30.

Address counter 40 is coupled to the D input of flip flop 42. It also controls the number of right bit shifts that arithmetic shift register 51 performs. The output of arithmetic shift register 51 is coupled to the B input of comparator 43 and the D input of flip flop 44. The Q output of flip flop 44 is connected to the A input of comparator 43. When the value of B is less than the value of A, comparator 43 generates output signals to the clock inputs of flip flops 44 and 42.

The apparatus shown in FIG. 6 is exactly like the apparatus shown in FIG. 5 except that the portion of the apparatus that was used for squaring and division (namely squarers 28 and divider 41) were respectively replaced by absolute value determiner 50 and arithmetic shift register 51. The changing of the squaring operation to an absolute value operation has the mathematical effect of generating all even harmonics of the input signal frequency. Fortunately, the second harmonics are quite small so the resulting error caused by the second (and other even) harmonics is tolerable. Changing the running division to an arithmetic right bit shift has the possible effect of not selecting the absolute best head-to-tail point. However, the actual point selected will still yield a good head-to-tail match.

Figure 7:
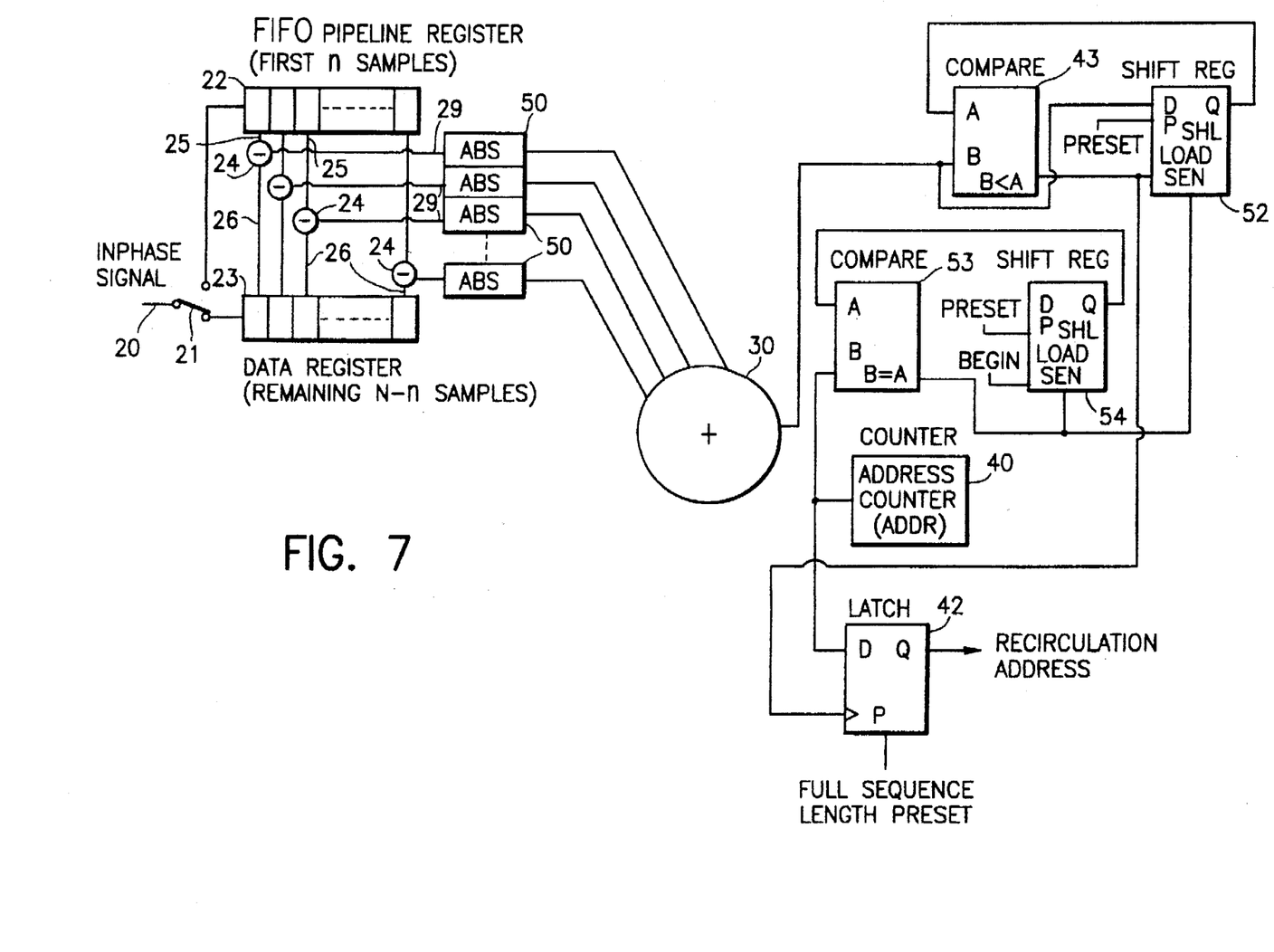

FIG. 7 illustrates an alternate embodiment of the present invention which utilizes a simpler hardware implementation than the FIG. 6 embodiment. The sum word is not right shifted on each clock cycle as illustrated in FIG. 6. Instead, a latched word at port A in comparator 43 is left bit shifted by shift register 52 to emulate multiplication-by-two each time the size of the address word at the counter 40 doubles. Comparator 53 senses when the address word doubles and triggers shift register 52. Comparator 53 also triggers shift register 54 to double the latched word at port A of comparator 53 so that this comparator can sense the next doubling of the address word. This procedure produces the same result as obtained in the FIG. 6 embodiment. Everything in FIG. 7 to the left of the summer 30 is identical to FIG. 6.

The above specification describes a new and improved system for synthesizing a continuous wave signal from a finite period complex signal waveform. It is realized that the above description may indicate to those skilled in the art additional ways in which the principals of this invention may be used without departing from the spirit. It is, therefore, intended that this invention be limited only by the scope of the appended claims.

What is claimed is:

1. In a method of synthesizing a substantially continuous wave (CW) signal from a sequence of samples of a finite periodic complex signal waveform by means of a repetitive head-to-tail reading of the sequence of samples out of a memory in response to an addressing of the memory, the improvement comprising the steps of:

a) digitizing the periodic waveform and storing digitized samples of the digitizing in the memory to obtain a stored record of the waveform;

b) selecting a first set of n digitized samples $X_i$ of the periodic waveform to obtain a reference segment of the record, i being a numerical index identifying addresses in the memory for the samples of the reference segment;

c) obtaining a further set of n digitized samples $X_{i+k}$ of the periodic waveform to provide a base segment of the record, (i+k) being a numerical index identifying addresses in the memory for the samples of the base segment;

d) positioning the reference and the base segments relative to each other to obtain correspondence between samples of the respective segments;

e) obtaining differences between the samples of respective ones of said reference segment and said base segment, thereby to provide a set of differences;

f) offsetting the relative position of the two segments by shifting memory addresses of samples of said base segment while retaining memory addresses of said reference segment, and repeating the difference-obtaining step wherein each offset is represented by an increment in k;

g) squaring the differences and summing squares of the differences to form a stored sum of squares $SSD_k$ given by the summation of the terms $(X_i - X_{i+k})^2$ wherein the reference segment includes a head sample address in the record of the periodic waveform and, after a succession of said offsetting steps, the base segment includes a tail sample address in the record of the periodic waveform;

h) repeating the steps e, f, and g for different values of k for obtaining a minimum value of the sum of squares SSD, wherein k is not equal to zero, the tail address of the recorded waveform is optimally phase matched with the head address of the recorded waveform upon occurrence of said minimum value; wherein, with respect to said offsetting step, there is a resulting increment in k which designates the relative position of the reference segment and the base segment upon attainment of the minimum value of the sum of squares SSD, said resulting increment in k serving as a measure of phase shift for obtaining optimal phase match between the head address and the tail address; and i) taking the totality of samples in the memory of the reference segment plus a number of additional samples of the base segment as constituting one period of a synthesized periodic waveform, wherein the number of the additional samples is equal to said resulting increment in k.

2. The method as recited in claim 1 wherein, in said repeating step, there is a repeating of steps e, f, and g for a second and subsequent values of k until all samples are completed.

3. The method as recited in claim 1, wherein a frequency of the waveform of the stored record differs from a frequency of the synthesized waveform based on a value of k, and wherein said resulting increment in k is obtained at the minimum value of the sum of squares SSD to result in a minimization of a resulting frequency error (Fe) of the synthesized waveform (CW) relative to the frequency of the waveform of the stored record.

4. In a system for synthesizing a substantially continuous wave signal from a sequence of samples of a finite periodic digitized complex signal waveform having an inphase and quadrature portion, wherein the system is operative by means of a repetitive head-to-tail reading of the sequence of samples out of a memory in response to an addressing of the memory, the improvement comprising:

means for reading out digitized samples from said memory, said reading-out means being operative to select a first segment and a second segment of said inphase portion, said reading-out means being operative to select a first segment and a second segment of said quadrature portion, said reading-out means being operative to read out of said memory n digitized samples in each of the first and the second segments of said inphase portion and in each of the first and the second segments of said quadrature portion;

means for shifting the first segment of the inphase portion of the periodic waveform relative to the second segment of the inphase portion by a sequence of shifts of sample addresses of the memory;

means coupled to said inphase shifting means for obtaining differences between the samples of respective ones of said first segment and said second segment of said inphase portion;

means coupled to said inphase difference means for squaring the inphase sample differences;

means for shifting the first segment of the quadrature portion of the periodic waveform relative to the second segment of the quadrature portion by a sequence of shifts of sample addresses of the memory;

means coupled to said quadrature shifting means for obtaining a difference between the samples of respective ones of said first segment and said second segment of said quadrature portion;

means coupled to said quadrature subtracting means for squaring the quadrature sample differences;

means coupled to said inphase squaring means and said quadrature squaring means for summing signals outputted by said inphase squaring means and said quadrature squaring means to produce a sequence of sum signals;

means coupled to said summing means for inversely scaling the sum signals by the number, 2n, of samples in the first and the second segments of inphase and quadrature portions so that resultant scaled-summed-squared-differences are inversely related to the optimum head-to-tail match point for recirculation playback, the match point being an end address for said memory for said repetitive reading;

wherein, with respect to said shifting of said first segment of each of said inphase and said quadrature portions, there is a resulting increment in said shifting which designates the relative position of the first segment and the second segment of respectively each of said inphase and said quadrature portions upon attainment of a minimum value of a sum signal, said resulting increment in said shifting serving as a measure of phase shift for obtaining optimal phase match between a head address and a tail address of said sequence of samples of said complex signal waveform; and the duration of a totality of samples stored in said memory of said first segment of either of said inphase and said quadrature portions plus a number of additional samples of said second segment of either of said respective inphase and said quadrature portions constitutes a period of a synthesized continuous wave signal, wherein the number of the additional samples is equal to said resulting increment in said shifting.

5. The system claimed in claim 4 wherein said inphase shifting means comprises registers holding each of the n samples of said first and of said second inphase segments as multi-bit words that represent portions of the inphase signal to be shifted relative to each other one or more positions.

6. The system claimed in claim 4 wherein said quadrature shifting means comprises registers holding each of the n samples of said first and of said second quadrature segments as multi-bit words that represent portions of the quadrature signal to be shifted relative to each other one or more positions.

7. The system claimed in claim 4, wherein said inversely scaling means comprises:
   a counter that counts the number of inphase and quadrature samples processed; and
   means coupled to said counter and said summing means for dividing the output of said summing means by the respective count of said counter.

8. The system claimed in claim 7, further including a comparator that is coupled to said counter and said dividing means for finding the smallest scaled-summed-squared-difference value that is present in the complete waveform.

9. A system for synthesizing a continuous wave signal from a sequence of samples of a finite periodic digitized inphase waveform, wherein said system is operative by means of a repetitive head-to-tail reading of the sequence of samples out of a memory in response to an addressing of the memory, the improvement comprising:
   means for reading out digitized samples from said memory, said reading-out means being operative to select a first segment and a second segment of said inphase waveform, said reading-out means being operative to read out of said memory n digitized samples in each of the first and the second segments of said inphase waveform;
   means for shifting the first segment of the inphase waveform relative to the second segment of the inphase waveform by a sequence of shifts of sample addresses of the memory;
   means coupled to said shifting means for obtaining differences between the samples of respective ones of said first segment and said second segment of said inphase waveform;
   means coupled to said difference means for squaring the sample differences;
   means coupled to said squaring means for summing signals outputted by said squaring means to produce a sequence of sum signals;
   means coupled to said summing means for inversely scaling the sum signals by the number, 2n, of samples processed so that a resultant scaled-summed-squared-difference is inversely related to the optimum head-to-tail match point for recirculation playback, the match point being an end address for said memory for said repetitive reading;
   wherein, with respect to said shifting of said first segment of said inphase waveform, there is a resulting increment in said shifting which designates the relative position of the first segment and the second segment of said inphase waveform upon attainment of a minimum value of a sum signal, said resulting increment in said shifting serving as a measure of phase shift for obtaining optimal phase match between a head address and a tail address of said sequence of samples of said inphase waveform; and the duration of a totality of samples stored in said memory of said first segment of said inphase waveform plus a number of additional samples of said second segment of said inphase waveform constitutes a period of a synthesized continuous wave signal, wherein the number of the additional samples is equal to said resulting increment in said shifting.

10. The system claimed in claim 9 wherein said inphase shifting means comprises registers holding each of the n samples of said first and of said second inphase segments as multi-bit words that represent portions of the inphase signal to be shifted relative to each other one or more positions.

11. The system claimed in claim 9, wherein said inversely scaling means comprises:
   a counter that counts the number of inphase and quadrature samples processed; and
   means coupled to said counter and said summing means for dividing the output of said summing means by the respective count of said counter.

12. The system claimed in claim 11, further including a comparator that is coupled to said counter and said dividing means for finding the smallest scaled-summed-squared difference value that is present in the waveform.

13. A system for synthesizing a substantially continuous wave signal from a sequence of samples of a finite periodic digitized inphase waveform, wherein said system is operative by means of a repetitive head-to-tail reading of the sequence of samples out of a memory in response to an addressing of the memory, the improvement comprising:
   means for reading out digitized samples from said memory, said reading-out means being operative to select a first segment and a second segment of said inphase waveform, said reading-out means being operative to read out of said memory n digitized samples in each of the first and the second segments of said inphase waveform;
   means for shifting the first segment of the inphase waveform relative to the second segment of the inphase waveform by a sequence of shifts of sample addresses of the memory;
   means coupled to said shifting means for obtaining differences between the samples of respective ones of said first segment and said second segment of said inphase waveform;
   means coupled to said difference means for determining the absolute value of the sample differences;
   means coupled to said absolute value means for summing absolute value samples outputted by said absolute value means to produce a sequence of sum signals;
   means coupled to said summing means for inversely scaling the sum signals by the number, 2n, of samples processed so that a resultant scaled-summed-squared-difference is inversely related to the optimum head-to-tail match point for recirculation playback, the match point being an end address for said memory for said repetitive reading;
   wherein, with respect to said shifting of said first segment of said inphase waveform, there is a resulting increment in said shifting which designates the relative position of the first segment and the second segment of said inphase waveform upon attainment of a minimum value of a sum signal, said resulting increment in said shifting serving as a measure of phase shift for obtaining optimal phase match between a head address and a tail address of said sequence of samples of said inphase waveform; and the duration of a totality of samples stored in said memory of said first segment of said inphase waveform plus a number of additional samples of said second segment of said inphase waveform constitutes a period of a synthesized continuous wave signal, wherein the number of the additional samples is equal to said resulting increment in said shifting.

14. The system claimed in claim 13 wherein said inphase shifting means comprises registers holding each of the n samples of said first and of said second inphase segments as multi-bit words that represent portions of the inphase signal to be shifted relative to each other one or more positions.

15. The system claimed in claim 14 wherein said inversely scaling means comprises:

a counter that counts the number of inphase and quadrature signals processed; and a register coupled to said counter and said summing means for dividing the output of said summing means by the respective count of said counter.

16. The system claimed in claim 15 further including a comparator that is coupled to said counter and said register for finding the smallest scaled-summed-squared-difference value that is present in the waveform.

17. The system claimed in claim 13, wherein said shifting means utilize a plurality of latches.

* * * * *